United States Patent
Thiele et al.

(10) Patent No.: US 7,977,634 B2
(45) Date of Patent: Jul. 12, 2011

(54) THERMAL IMAGING CAMERA

(75) Inventors: Fritz Thiele, Krummesse (DE); Markus Wansing, Lübeck (DE)

(73) Assignee: Dräger Safety AG & Co. KGaA, Lübeck (DE)

( * ) Notice: Subject to any disclaimer, the term of this patent is extended or adjusted under 35 U.S.C. 154(b) by 0 days.

(21) Appl. No.: 12/629,389

(22) Filed: Dec. 2, 2009

(65) Prior Publication Data
US 2010/0207024 A1 Aug. 19, 2010

(30) Foreign Application Priority Data

Feb. 18, 2009 (DE) .................. 10 2009 009 360

(51) Int. Cl.
*G01J 5/00* (2006.01)
(52) U.S. Cl. ....................................................... 250/330
(58) Field of Classification Search .................. 250/330, 250/332, 339.02, 342
See application file for complete search history.

(56) References Cited

U.S. PATENT DOCUMENTS

| | | | |
|---|---|---|---|
| 4,361,001 A | 11/1982 | Almond et al. | |
| 4,593,207 A * | 6/1986 | McRight et al. | 327/141 |
| 5,396,069 A * | 3/1995 | Craig et al. | 250/330 |
| 5,637,871 A | 6/1997 | Piety et al. | |
| 6,023,288 A * | 2/2000 | Coombs et al. | 348/64 |
| 6,476,391 B1 * | 11/2002 | Zhang | 250/330 |
| 7,307,793 B2 | 12/2007 | Ottney et al. | |
| 2002/0175815 A1 * | 11/2002 | Baldwin | 340/567 |
| 2006/0060762 A1 * | 3/2006 | Chan et al. | 250/221 |
| 2007/0075918 A1 * | 4/2007 | Cuprys et al. | 345/8 |
| 2007/0109638 A1 * | 5/2007 | Tai | 359/399 |
| 2008/0129839 A1 * | 6/2008 | Asukai et al. | 348/231.99 |

FOREIGN PATENT DOCUMENTS

| | | |
|---|---|---|
| DE | 102004030986 A | 1/2006 |
| JP | 2006060542 A | 3/2006 |

OTHER PUBLICATIONS

Bullard Thermal Imager User Manual, Cynthiana, KY, USA: Bullard, 2001.
Flir Systems, Inc, "Recon III ObservIR" [online], Available from: http://www.gs.flir.com/uploadedFiles/GS/datasheets/L_A4_Recon_III_ObservIR.pdf [Accessed Feb. 3, 2010] and http://www.janes.com/articles/Janes-Electro-Optic-Systems/FLIR-Systems-MilCAM-Recon-III-United-States.html [Accessed Feb. 3, 2010].
Flir Systems Inc, "H-Series" [online], Available from: http://www.flir.com/cvs/eurasis/en/content/?id=24760 [Accessed Feb. 3, 2010] and http://Investors.flir.com/releasedetail.cfm?ReleaseID=395856 [Accessed Feb. 3, 2010.

* cited by examiner

*Primary Examiner* — David P Porta
*Assistant Examiner* — Marcus H Taningco
(74) *Attorney, Agent, or Firm* — McGlew and Tuttle, P.C.

(57) ABSTRACT

A thermal imaging camera (1) is provided in which the utilization of the energy reserve carried along is improved in a thermal imaging camera. A sensor element (9) is provided at the carrying device of the thermal imaging camera. The sensor element (9) generates a switching signal for switching between a standby phase and an operating phase.

20 Claims, 2 Drawing Sheets

THERMAL IMAGING CAMERA

CROSS REFERENCE TO RELATED APPLICATIONS

This application claims the benefit of priority under 35 U.S.C. §119 of German Patent Application DE 10 2009 009 360.5 filed Feb. 18, 2009, the entire contents of which are incorporated herein by reference.

FIELD OF THE INVENTION

The present invention pertains to a portable thermal imaging camera and to a process for operating a thermal imaging camera.

BACKGROUND OF THE INVENTION

Thermal imaging cameras are used by firefighters or rescue teams in fires in buildings or to guide persons in dangerous situations. A temperature distribution is recorded with the thermal imaging camera by means of an infrared camera and converted into thermal image data. The thermal image data are transmitted to a display means and visually displayed there as a thermal image. Visibility is frequently greatly limited in a fire by the smoke generated, so that the thermal imaging camera is used as a visual aid.

A combination of a thermal imaging camera with a fire-extinguisher is known from DE 10 2004 030 986 A1. The thermal imaging camera is either connected detachably to the fire-extinguisher or the fire-extinguisher and the thermal imaging camera are located in a common housing, the optical axis of the thermal imaging camera extending essentially in parallel to the axis of the fire-extinguisher, in this case a water gun. The display means of the thermal imaging camera is arranged here such that the firefighter can see it directly, and a handle, with which the thermal imaging camera and the fire-extinguisher can be aimed at the target, is located under the thermal imaging camera.

The prior-art thermal imaging camera is used as a mobile camera, so that an energy source, for example, a battery pack, or a battery, must be carried along for the operation. Since the energy source cannot normally be replaced or recharged during the use of the thermal imaging camera, the greatest possible depletion of the existing energy reserve is necessary to make it possible to use the thermal imaging camera during longer use times as well.

SUMMARY OF THE INVENTION

The basic object of the present invention is to propose a thermal imaging camera that makes possible an improved utilization of the energy reserve carried along and to propose a process for operating a thermal imaging camera.

According to the present invention, the thermal imaging camera has a sensor element, which is designed to generate a switching signal, with which switching from a standby phase to an operating phase can be carried out. The standby phase, also called "standby mode," is used to maintain the readiness of the thermal imaging camera to operate by the power consumption being reduced to a minimum. For example, the background lighting of the display means may be either reduced or even switched off altogether for this, and it is also possible to interrupt the processing of thermal image data by the control unit of the thermal imaging camera, without the thermal imaging camera having to be switched off completely for this.

The sensor element is arranged either directly at the camera housing or on a carrying device of the camera housing. The carrying device may be, for example, a handle under the camera housing. The sensor element is positioned such that the switching signal is generated when the camera housing or the carrying device is grasped.

It is also within the scope of the present invention to use a plurality of sensor elements at the thermal imaging camera, of which one sensor element is located, for example, at the camera housing and another at the carrying device. In case of a carrying device that can be separated from the camera housing, an additional sensor element may be provided in the connection area between the carrying device and the camera housing. If, for example, the camera housing is separated from the carrying device, which may also be a fire-extinguisher or a helmet, the thermal imaging camera is brought into the standby phase by the sensor element arranged in the connection area. If the user then again takes the camera housing into his or her hand in order to perform an additional measurement, a switching signal is generated by a sensor element on the camera housing to activate the operating phase.

The sensor element is advantageously designed as an optical sensor operating in a contactless manner, an inductive sensor, an infrared sensor or a capacitive sensor, or the sensor element is a pushbutton, a switch or an acceleration sensor responding to changes in motion.

Sensor elements operating in a contactless manner have the advantage that the switching signal is generated already when the hand is approaching the camera housing or the carrying device, whereas the acceleration sensor responds, by contrast, to a change in location.

Provisions are made according to the present invention for the standby phase to be set when the switching signal is present after an adjustable time delay in intermediate steps. Thus, only the background lighting of the display device may be reduced when the switching signal is present immediately thereafter in a first mode of operation of the standby phase, while the measuring function is still maintained. When the sensor element is again actuated by the user shortly thereafter because, for example, the user the thermal imaging camera down only briefly, the first mode of operation of the standby phase is again left and the background lighting is again set to the full luminosity in the operating mode. If, by contrast, the thermal imaging camera is no longer used after it has been put down, it is switched over to a second mode of operation of the standby phase after a preselectable time delay, in which mode the functions of the device are reduced to the absolute minimum in order to drain the energy source only slightly.

The process according to the present invention pertains to a thermal imaging camera, which comprises an image detection means, a display means for outputting collected image data, a control unit for processing the thermal image data detected, and a touch-sensitive sensor element, wherein a switching means is provided for switching between a standby phase and an operating phase and a switching signal triggering the switching is generated during tactile actuation of the sensor element.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
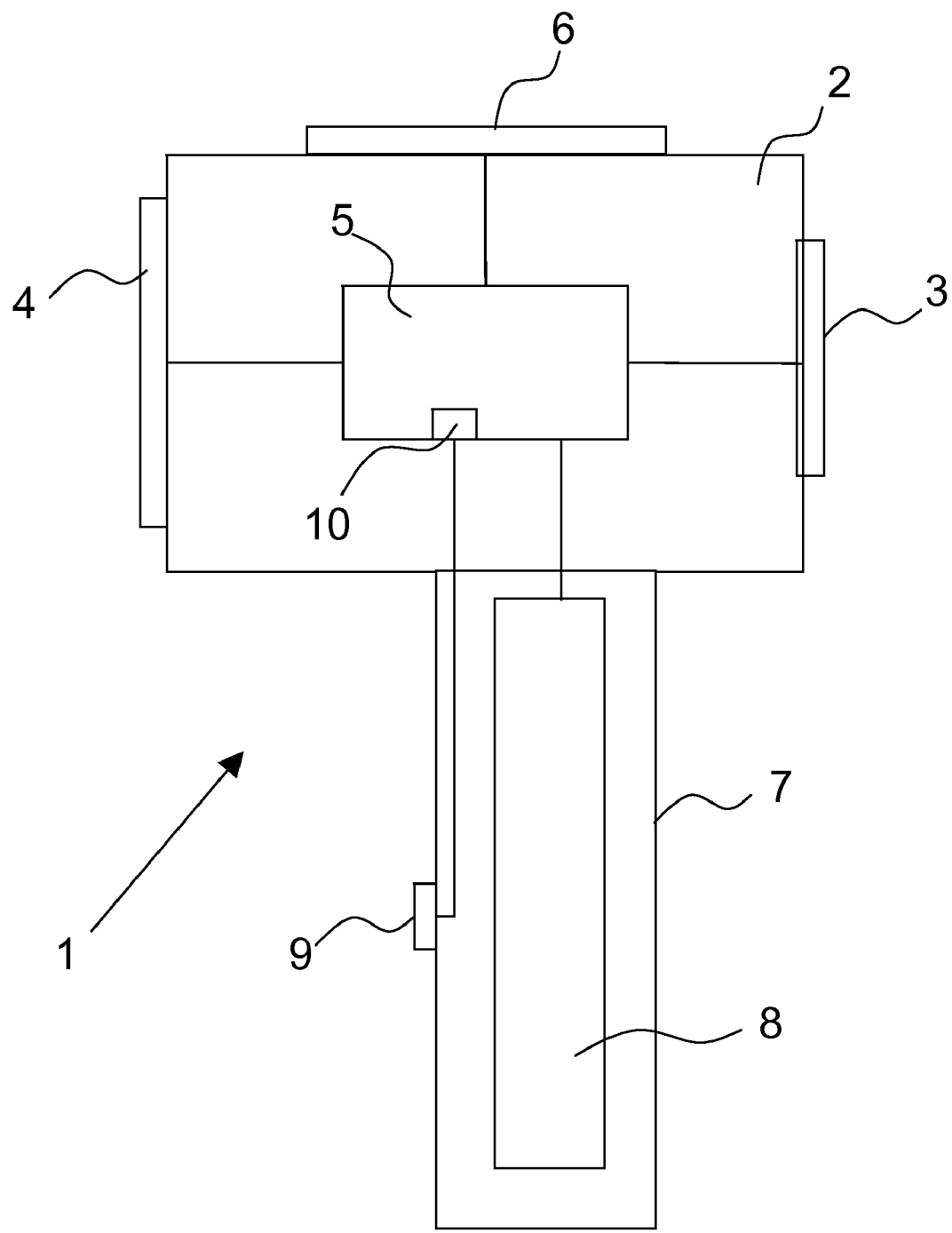
FIG. 1 is a schematic diagram of a first embodiment of a thermal imaging camera according to the invention.

Referring to the drawings in particular, FIG. 1 schematically shows a first thermal imaging camera 1, in which an optical image detection means 3, a display means 4 for outputting thermal image data and a control unit 5 for processing the thermal image data detected are accommodated in a camera housing 2. An operating unit 6, via which the different functions of the device can be activated, is located on the top side of the camera housing 2. A handle 7, which contains a battery pack 8 as the energy supply of the thermal imaging camera 1, is attached to the underside of the camera housing 2 as a carrying device. A capacitive sensor 9, which is connected to the control unit 5 and generates a switching signal when the handle 7 is grasped by a hand of a user, which hand is not shown in FIG. 1, is arranged as a sensor element on the outside of the handle 7. A switching signal is likewise generated in the reversed case, when the user lets go of the handle 7. A switch from the standby phase to the operating phase is brought about by the switching signal when the handle 7 is grasped. If, by contrast, the user lets go of the handle 7, the operating state switches to the standby phase.

The control unit 5 contains a microprocessor, not shown more specifically, which performs all the necessary computation and control functions. A switching device 10 in the form of a program module, with which a switch between a standby phase and an operating phase is performed when the switching signal is present, is provided within the control unit 5. The switching device 10 is designed such that the operating phase is reached in two steps at the time of the switch to the standby phase, and only the background lighting of the display means 4 is reduced in a first step, in the form of a first mode of operation, whereas the functions of the device are reduced to the absolute minimum in a second step, a second mode of operation, which is reached after the end of a predetermined time delay.

The first mode of operation is useful in cases in which the first thermal imaging camera 1 is put aside only briefly and is then used again. The measuring function remains fully preserved during this time. By contrast, the measuring functions are switched off in the second mode of operation and are reactivated only at the time of switching to the operating phase. Measured values determined before are stored and preserved.

Figure 2:
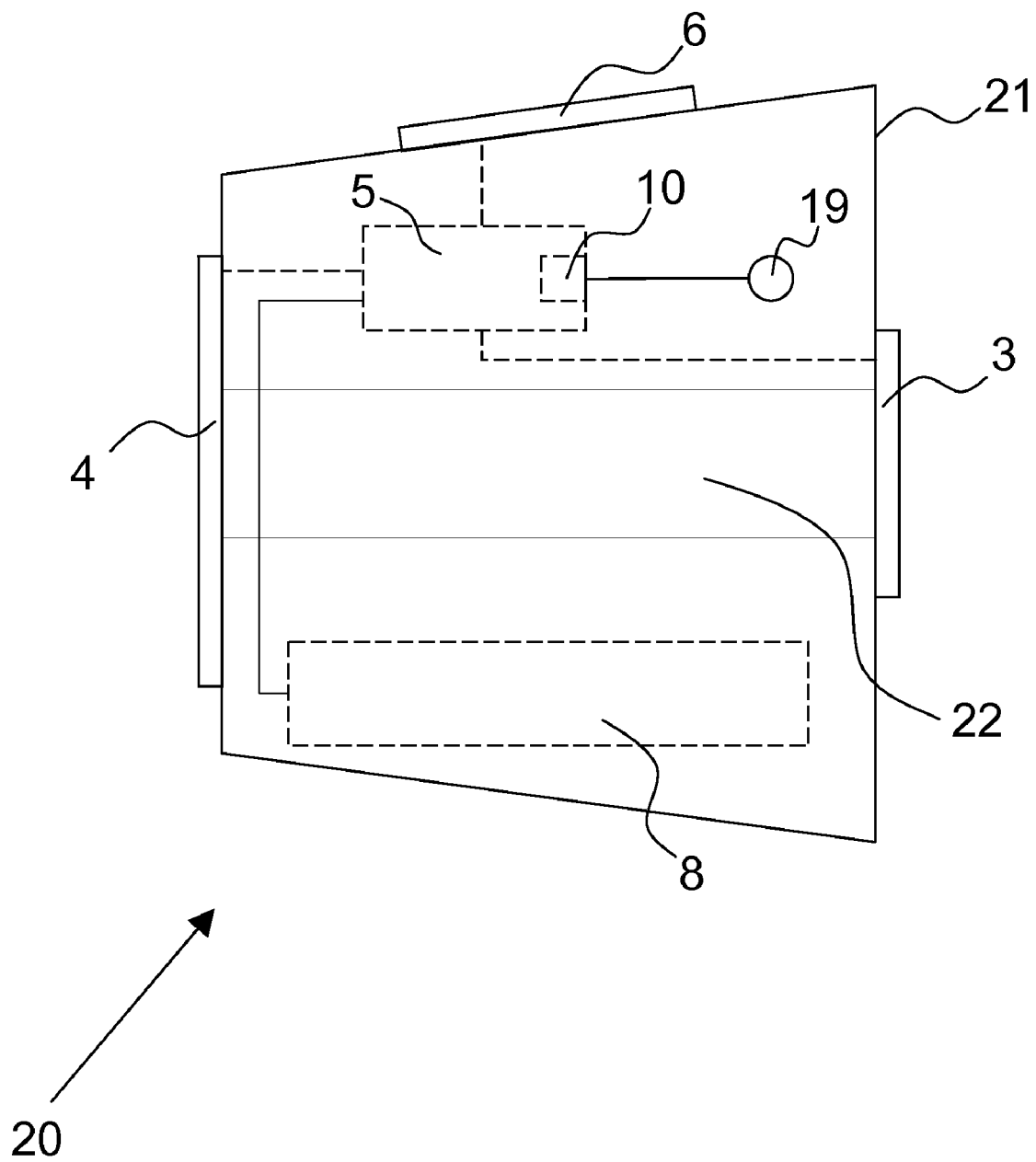
FIG. 2 is a schematic diagram of a second embodiment of a thermal imaging camera according to the invention.

FIG. 2 shows a second thermal imaging camera 20, in which the battery pack 8 is accommodated in the camera housing 21, unlike in the thermal imaging camera 1 according to FIG. 1. Identical components are designated by the same reference numbers as in FIG. 1. The camera housing 21 has a laterally arranged gripping strap 22, with which a user can hold the second thermal imaging camera 20 in his hand A second capacitive sensor 19, which is connected to the control unit 5 and generates a switching signal when the hand of a user is passed through the gripping strap or when the user grasps the camera housing 21 with his or her hand, is located above the gripping strap 22. The operating phase of the second thermal imaging camera 20 is activated by the switching signal. If, by contrast, the user's hand is removed from the gripping strap 22 of the second thermal imaging camera 20, a switch to the standby phase is brought about by the switching signal.

While specific embodiments of the invention have been described in detail to illustrate the application of the principles of the invention, it will be understood that the invention may be embodied otherwise without departing from such principles.

APPENDIX

List of Reference Numbers

1 First thermal imaging camera
2 Camera housing
3 Image detection means
4 Display means
5 Control unit
6 Operating unit
7 Handle
8 Battery pack
9, 19 Capacitive sensor
10 Switching device
20 Second thermal imaging camera
21 Camera housing
22 Gripping strap

What is claimed is:

1. A portable thermal imaging camera comprising:
   a camera housing;
   a thermal image detection device providing thermal image data, the thermal image detection device being in the camera housing;
   a display device for the output of thermal image data, the display device being in the camera housing;
   a control unit for processing the thermal image data detected, the control unit being in the camera housing;
   an energy supply unit;
   a switching means for switching one or more of said display device and said thermal image detection device between a standby phase and an operating phase; and
   at least one sensor element for generating a switching signal for the switching means for switching between the standby phase and the operating phase in case of actuation, said one or more of said display device and said thermal image detection device providing said thermal image data as output in at least a portion of said standby phase.

2. A device in accordance with claim 1, wherein a switch from the operating phase to the standby phase or from the standby phase to the operating phase is performed by the switching signal.

3. A device in accordance with claim 1, wherein the sensor element is arranged at the camera housing or at a carrying device of the camera housing.

4. A device in accordance with claim 1, wherein the sensor element is a contactless infrared sensor, an optical sensor, an inductive sensor or a capacitive sensor, a pushbutton or an acceleration sensor responding to changes in motion of said camera housing.

5. A device in accordance with claim 1, wherein the standby phase comprises at least two modes of operation, wherein a first mode of operation is activated by the switching signal and a second mode of operation is present after the end of a predetermined time delay, wherein said display device is in an operating state with a first display light intensity in said first mode of operation, said display device being in said operating state with a second display light intensity in said first mode of operation, said first display light intensity being greater than said second display light intensity, said display device being in an off state in said second mode of operation, wherein power supplied to display is greater in said first mode of operation than in said second mode of operation.

6. A device in accordance with claim 5, wherein said sensor element is an acceleration sensor responding to changes in motion in said camera housing, said one or more of said display device and said thermal image detection device being in said operating phase upon detection of said changes in motion via said acceleration sensor, said one or more of said display device and said thermal image detection device being in said standby phase upon said acceleration sensor detecting no changes in motion in said camera housing after a predetermined time delay.

7. A portable thermal imaging camera comprising:
a camera housing;
a thermal image detection device providing thermal image data, the thermal image detection device being supported by the camera housing;
a display device for the output of thermal image data, the display device being supported by the camera housing;
a control unit for processing the thermal image data detected, the control device being supported by the camera housing;
an energy supply unit supported by the camera housing;
a switching device one of forming a part of the control unit and connected to the control unit for switching between an operating phase with power for operation provided to the thermal image detection device and the display device and a standby phase in which power to at least one of the thermal image detection device and the display device is lowered as compared to the operating phase, said standby phase including a first standby phase and a second standby phase, wherein power supplied to said at least one of the thermal image detection device and the display device in said first standby phase is less than power supplied to said at least one of the thermal image detection device and the display device in said second standby phase, said at least one of the thermal image detection device and the display device providing the thermal image data as output in said first standby phase; and
at least one sensor element for generating a switching signal for the switching device for switching between the standby phase and the operating phase in case of actuation, the sensor element being supported by the camera housing.

8. A device in accordance with claim 7, wherein a switch from the operating phase to the standby phase or from the standby phase to the operating phase is performed by the switching signal.

9. A device in accordance with claim 7, wherein the sensor element is arranged at the camera housing or at a carrying device of the camera housing.

10. A device in accordance with claim 7, wherein the sensor element is a contactless infrared sensor, an optical sensor, an inductive sensor or a capacitive sensor, a pushbutton or an acceleration sensor responding to changes in motion of said camera housing.

11. A device in accordance with claim 7, wherein the standby phase comprises at least two modes of operation, wherein a said first standby phase is activated by the switching signal and a said second standby phase is present after the end of a predetermined time delay.

12. A device in accordance with claim 7, wherein said display device is in an off state in said second standby phase, said display device comprising a first light intensity in said first standby phase, said display device comprising a second light intensity in said second standby phase, said second light intensity being less than said first light intensity.

13. A device in accordance with claim 7, wherein said sensor element is an acceleration sensor responding to changes in motion in said camera housing, said at least one of the thermal image detection device and the display device being in said standby phase upon said acceleration sensor detecting no changes in motion after a predetermined time delay, said at least one of the thermal image detection device and the display device being in said operating phase upon detection of said changes in motion via said acceleration sensor.

14. A device in accordance with claim 13, wherein said predetermined time delay comprises a first predetermined time delay and a second predetermined time delay, said display device comprising a first light intensity after said first predetermined time delay, said display device comprising a second light intensity after said second predetermined time delay, said second light intensity being less than said first light intensity.

15. A process for operating a thermal imaging camera, the process comprising the steps of:
providing a camera housing;
providing a thermal image detection device providing thermal image data, the thermal image detection device being supported by the camera housing;
providing a display device for the output of thermal image data, the display device being supported by the camera housing;
providing a control unit for processing the thermal image data detected, the control device being supported by the camera housing;
providing an energy supply unit supported by the camera housing;
providing a switching device one of forming a part of the control unit and connected to the control unit for switching between an operating phase with power for operation provided to the thermal image detection device and the display device and a standby phase in which power to at least one of the thermal image detection device and the display device is lowered as compared to the operating phase, said standby phase comprising a first standby phase and a second standby phase, said display device comprising a first display intensity in said operating phase, said display device comprising a second display intensity in said first standby phase, said display device being in an off state in said second standby phase, said second display intensity being less than said first display intensity;
providing at least one sensor element for generating a switching signal for the switching device for switching between the standby phase and the operating phase in case of actuation, the sensor element being supported by the camera housing; and
switching between the standby phase and the operating phase upon actuation of the sensor element.

16. A process in accordance with claim 15, wherein the switching from the operating phase to the standby phase or from the standby phase to the operating phase is triggered by the switching signal.

17. A process in accordance with claim 15, wherein the sensor element is arranged at the camera housing or at a carrying device of the camera housing.

18. A process in accordance with claim 15, wherein the sensor element is a contactless infrared sensor, an optical sensor, an inductive sensor or a capacitive sensor, a pushbutton or an acceleration sensor responding to changes in motion of said camera housing.

19. A process in accordance with claim 15, wherein the standby phase comprises at least two modes of operation, wherein a first mode of operation is activated by the switching signal and a second mode of operation is present after the end of a predetermined time delay.

20. A device in accordance with claim 15, wherein said sensor element is an acceleration sensor responding to changes in motion in said camera housing, said at least one of said thermal image detection device and said display device being in said standby phase upon said acceleration sensor detecting no changes in motion after a predetermined time delay, said at least one of said thermal image detection device and said display device being in said operating phase upon detection of said changes in motion via said acceleration sensor.

* * * * *